United States Patent
Kenney et al.

(10) Patent No.: US 9,591,569 B2
(45) Date of Patent: Mar. 7, 2017

(54) WIRELESS DEVICE, METHOD, AND COMPUTER READABLE MEDIA FOR SYNCHRONIZATION IN A WIRELESS LOCAL-AREA NETWORK

(71) Applicant: Intel IP Corporation, Santa Clara, CA (US)

(72) Inventors: Thomas J. Kenney, Portland, OR (US); Shahrnaz Azizi, Cupertino, CA (US); Robert J. Stacey, Portland, OR (US); Guoqing C. Li, Portland, OR (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 77 days.

(21) Appl. No.: 14/572,351

(22) Filed: Dec. 16, 2014

(65) Prior Publication Data

US 2016/0050623 A1    Feb. 18, 2016

Related U.S. Application Data

(60) Provisional application No. 62/037,763, filed on Aug. 15, 2014.

(51) Int. Cl.
*H04W 52/02* (2009.01)
*H04W 56/00* (2009.01)
(Continued)

(52) U.S. Cl.
CPC ....... *H04W 52/0216* (2013.01); *H04L 5/0023* (2013.01); *H04L 5/0048* (2013.01);
(Continued)

(58) Field of Classification Search
CPC ........... H04W 52/0216; H04W 56/001; H04W 48/12; H04W 84/12; H04L 5/0082; H04L 5/0048; H04L 5/0023
See application file for complete search history.

(56) References Cited

U.S. PATENT DOCUMENTS 3,052,950 A    9/1962   Gennaro
2004/0233936 A1   11/2004  Cheng
(Continued)

FOREIGN PATENT DOCUMENTS

CN    102271403 B    6/2014
TW    201309055 A    2/2013
(Continued)

OTHER PUBLICATIONS

"International Application Serial No. PCT/US2015/036223, International Search Report mailed Oct. 27, 2015", 3 pgs.
(Continued)

*Primary Examiner* — Mohammad Anwar
(74) *Attorney, Agent, or Firm* — Schwegman Lundberg & Woessner, P.A.

(57) ABSTRACT

Wireless devices, methods, and computer readable media for synchronization in a wireless local-area network. A method on a wireless communication device may include tuning to a first subchannel based on a schedule received from an access point (AP) the schedule to indicate that the HEW device is assigned to the first subchannel. The method may further include determining a target beacon receive time and tuning to a second subchannel to receive the target beacon at the target beacon receive time. The method may further include receiving the target beacon on the second subchannel and tuning back to the first subchannel. A method on an AP for synchronization may include transmitting information that indicates a target beacon receive time on a subchannel. The method may include not transmitting to a wireless communication device operating on a second subchannel for a period of time before the target beacon receive time, and transmitting a target beacon on a first subchannel at the target beacon receive time.

17 Claims, 6 Drawing Sheets

(51) Int. Cl.
*H04L 5/00* (2006.01)
*H04W 84/12* (2009.01)
*H04W 48/12* (2009.01)

(52) U.S. Cl.
CPC ......... *H04L 5/0082* (2013.01); *H04W 56/001* (2013.01); *H04W 48/12* (2013.01); *H04W 84/12* (2013.01); *Y02B 60/50* (2013.01)

(56) References Cited

U.S. PATENT DOCUMENTS

| | | | |
|---|---|---|---|
| 2005/0054294 A1* | 3/2005 | Khun-Jush | H04W 16/14 455/63.1 |
| 2006/0089138 A1* | 4/2006 | Smith | H04W 52/0229 455/426.1 |
| 2012/0113952 A1 | 5/2012 | Kneckt et al. | |
| 2013/0039298 A1 | 2/2013 | Park et al. | |
| 2013/0286959 A1* | 10/2013 | Lou | H04W 72/04 370/329 |
| 2014/0140208 A1 | 5/2014 | Cherian et al. | |
| 2015/0327121 A1* | 11/2015 | Li | H04W 28/12 370/328 |
| 2016/0066324 A1* | 3/2016 | Li | H04L 69/22 370/338 |

FOREIGN PATENT DOCUMENTS

| | | |
|---|---|---|
| TW | 201349815 A | 12/2013 |
| TW | 201613395 A | 4/2016 |
| WO | WO-2013022294 A2 | 2/2013 |
| WO | WO-2016025074 A1 | 2/2016 |

OTHER PUBLICATIONS

"International Application Serial No. PCT/US2015/036223, Written Opinion mailed Oct. 27, 2015", 7 pgs.

"Taiwanese Application Serial No. 104121520, Office Action mailed May 24, 2016", W/ English Search Report, 7 pgs.

\* cited by examiner

WIRELESS DEVICE, METHOD, AND COMPUTER READABLE MEDIA FOR SYNCHRONIZATION IN A WIRELESS LOCAL-AREA NETWORK

PRIORITY CLAIM

This application claims the benefit of priority under 35 USC 119(e) to U.S. Provisional Patent Application Ser. No. 62/037,763, filed Aug. 15, 2014 [reference number P71432Z] which is incorporated herein by reference in its entirety.

TECHNICAL FIELD

Embodiments pertain to wireless communications in a wireless local-area network (WLAN). Some embodiments relate to synchronization to receive beacon frames in a WLAN operating in accordance with orthogonal frequency division multiple access (OFDMA).

BACKGROUND

One issue with communicating data over a wireless network is transmitting and receiving beacon frames. Often stations (STA) need to receive beacon frames from access points (APs) to communicate properly with the APs. Another issue with communicating data over a wireless network is that often more than one standard may be in use in a wireless local-area network (WLAN). Another issue is that often wireless devices need to conserve power for many reasons, including conserving batteries.

Thus, there are general needs for systems and methods that allow access points to transmit beacon frames and base stations to receive beacon frames. There are also general needs for systems and methods that allow wireless communication devices to coexist with legacy devices and to conserve power.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
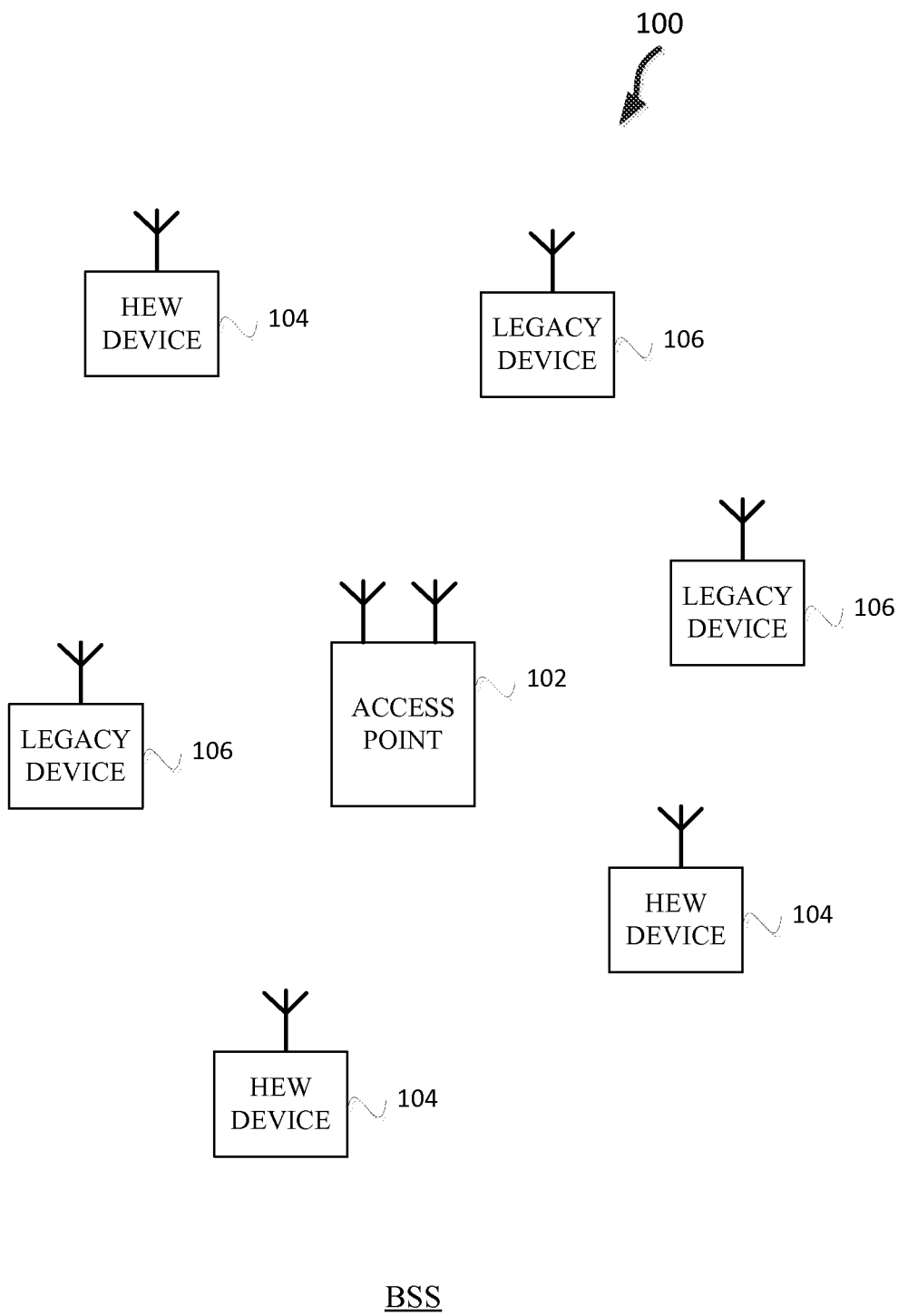
FIG. 1 illustrates a wireless network in accordance with some embodiments.

FIG. 1 illustrates a wireless network in accordance with some embodiments. The wireless local-area network (WLAN) may comprise a basis service set (BSS) 100 that may include an access point (AP) 102, a plurality of high-efficiency wireless (HEW) (e.g., IEEE 802.11ax) devices 104 and a plurality of legacy (e.g., IEEE 802.11n/ac) devices 106.

The AP 102 may be an access point (AP) using the 802.11 to transmit and receive. The AP 102 may be a base station. The AP 102 may use other communications protocols as well as the 802.11 protocol. The 802.11 protocol may be 802.11ax. The 802.11 protocol may include using Orthogonal Frequency-Division Multiple Access (OFDMA), time division multiple access (TDMA), and/or code division multiple access (CDMA). The 802.11 protocol may include a multiple access technique. For example, the 802.11 protocol may include space-division multiple access (SDMA) and/or multi-user (MU) multiple-input and multiple-output (MIMO)(MU-MIMO).

The HEW devices 104 may operate in accordance with 802.11ax or another standard of 802.11. The legacy devices 106 may operate in accordance with one or more of 802.11 a/g/ag/n/ac, or another legacy wireless communication standard.

The HEW devices 104 may be wireless transmit and receive devices such as cellular telephone, handheld wireless device, wireless glasses, wireless watch, wireless personal device, tablet, or another device that may be transmitting and receiving using the 802.11 protocol such as 802.11ax or another wireless protocol.

The BSS 100 may operate on a primary channel and one or more secondary channels or sub-channels. The BSS 100 may include one or more APs 102. In accordance with embodiments, the AP 102 may communicate with one or more of the HEW devices 104 on one or more of the secondary channels or sub-channels or the primary channel. In example embodiments, the AP 102 communicates with the legacy devices 106 on the primary channel. In example embodiments, the AP 102 may be configured to communicate concurrently with one or more of the HEW devices 104 on one or more of the secondary channels and a legacy device 106 utilizing only the primary channel and not utilizing any of the secondary channels.

The AP 102 may communicate with legacy devices 106 in accordance with legacy IEEE 802.11 communication techniques. In example embodiments, the AP 102 may also be configured to communicate with HEW devices 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth and the bandwidth may be one of 20 MHz, 40 MHz, or 80 MHz, 160 MHz, 320 MHz contiguous bandwidths or an 80+80 MHz (160 MHz) non-contiguous bandwidth. In some embodiments, bandwidths of 1 MHz, 1.25 MHz, 2.5 MHz, 5 MHz and 10 MHz, or a combination thereof, may also be used. A HEW frame may be configured for transmitting a number of spatial streams.

In other embodiments, the AP 102, HEW device 104, and/or legacy device 106 may also implement different technologies such as CDMA2000, CDMA2000 1x, CDMA2000 EV-DO, Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (Wi-MAX)), BlueTooth®, or other technologies.

In example embodiments, if the AP 102 transmits a beacon only on a primary channel, then the HEW devices 104 and legacy devices 106 need to receive the beacon on the primary channel every multiple of a beacon interval (it could be every beacon interval or every 10th beacon or etc) to maintain their synchronization with the system (e.g. AP 102).

In an OFDMA system (e.g. 802.11ax), an associated HEW device 104 may operate on a subchannel, which may be 20 MHz, of the BSS 100 (that can operate, for example, at 80 MHz). The HEW device 104 may enter a power save mode, and upon coming out of power save mode, the HEW device 104 may need to re-synchronize with BSS 100 by receiving a beacon. If a beacon is transmitted only on the primary channel, then HEW device 104 needs to move and tune to the primary channel upon waking up to be able to receive beacons. Then the HEW device 104 needs to re-tune back to its operating subchannels, which may be 20 MHz, or it has to follow a handshake procedure to let AP 102 know of a new operating subchannel. The HEW device 104 may risk losing some frames during the channel switch, in example embodiments.

In example embodiments, the AP 102 is configured to transmit beacon frames according to one or more of the embodiments disclosed herein. For example, the AP 102 is configured as described in conjunction with FIGS. 2-7. In example embodiments, the AP 102 transmits beacons on a primary channel. In example embodiments, the AP 102 transmits a beacon with information regarding how to determine when beacons will be transmitted.

In example embodiments, the HEW device 104 is configured to receive beacon frames according to one or more of the embodiments disclosed herein in conjunction with FIGS. 2-7. In example embodiments, the HEW device 104 needs to receive a beacon after coming out of power saving mode to synchronize properly with the AP 102.

In example embodiments, the HEW device 104 may tune into only one sub-channel to save power. In example embodiments, the HEW device 104 determines when a beacon frame will be transmitted on a primary channel and retunes from a sub-channel the HEW device 104 is using to the primary channel to receive a beacon frame to synchronize with the BSS 100. In example embodiments, the HEW device 104 retunes back to the sub-channel after receiving the beacon. In example embodiments, the HEW device 104 remains on the sub-channel until right before the beacon is transmitted so as not to lose packets for the HEW device 104.

Some embodiments relate to high-efficiency wireless communications including high-efficiency Wi-Fi/WLAN and high-efficiency wireless (HEW) communications. In accordance with some IEEE 802.11ax (High-Efficiency Wi-Fi (HEW)) embodiments, an AP 102 may operate as a master station which may be arranged to contend for a wireless medium (e.g., during a contention period) to receive exclusive control of the medium for an HEW control period (i.e., a transmission opportunity (TXOP)). The AP 102 may transmit an HEW master-sync transmission at the beginning of the HEW control period. The AP 102 may transmit a time duration of the TXOP. During the HEW control period, HEW devices 104 may communicate with the AP 102 in accordance with a non-contention based multiple access technique. This is unlike conventional WLAN communications in which devices communicate in accordance with a contention-based communication technique, rather than a multiple access technique. During the HEW control period, the AP 102 may communicate with HEW devices 104 using one or more HEW frames. During the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station may also communicate with legacy stations in accordance with legacy IEEE 802.11 communication techniques. In some embodiments, the master station may also be configurable communicate with HEW devices 104 outside the HEW control period in accordance with legacy IEEE 802.11 communication techniques, although this is not a requirement.

Figure 2:
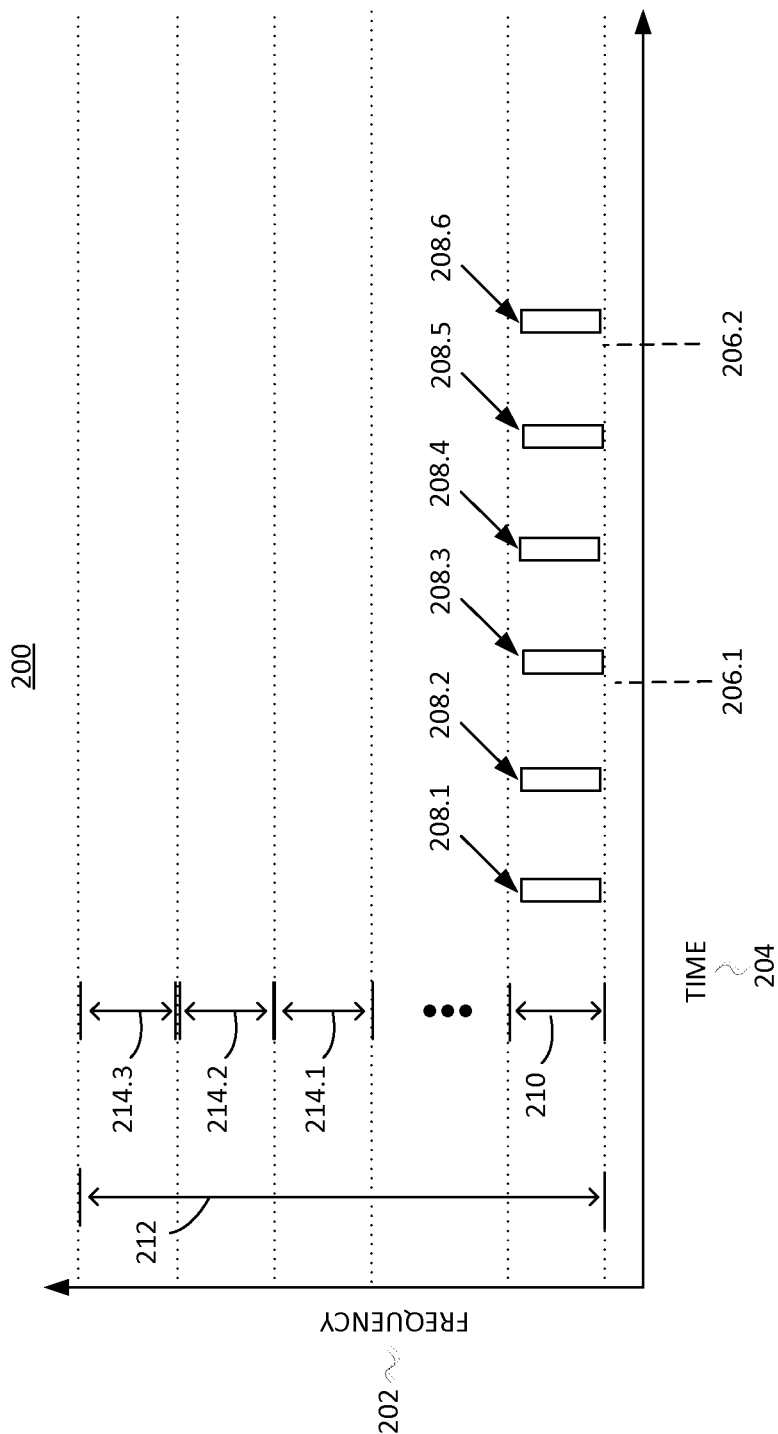
FIG. 2 illustrates a method to maintain system synchronization according to example embodiments.

FIG. 2 illustrates a method 200 to maintain system synchronization according to example embodiments. Illustrated in FIG. 2 is frequency 202 along the vertical axis and time 204 along the horizontal axis. Also illustrated in FIG. 2 is a primary channel 210, operation bandwidth 212, subchannels 214, target beacon receive time (TBRT) 206, and beacons 208.

The operation bandwidth 212 may be an operation frequency range of the BSS 100, which may be a segment of the radio frequency spectrum. For example, for 802.11ac or 802.11ax this may be 80 MHz, 160 MHz, or 320 MHz. The subchannels 214 are subchannels of the operation bandwidth 212. For example, the subchannels 214 may be 1.25, 2.5, 5, 10, 20, 40, or 80 MHz, or another appropriate value.

In example embodiments, the primary subchannel 210 is a subchannel 214 of the BSS 100, which is used by the AP 102 to transmit the beacon frames 208. For example, the primary subchannel 210 may be a primary subchannel 210 as specified in an IEEE 802.11 specification such as 802.11ax or 802.11ac, or in other wireless specifications. The primary subchannel 210 may have a bandwidth such as 20 MHz, or another value, in accordance with a wireless standard. The primary subchannel 210 may be used by both HEW devices 104 and legacy device 106 to receive beacons 208.

The beacons 208 may be beacon frames for wireless communication such as in 802.11, 802.11ac, or 802.11ax. In example embodiments, the beacons 208 include information that assists a HEW device 104 in synchronizing with the AP 102 and/or BSS 100. The beacon 208 may be as specified in one or more IEEE 802.11 specifications such as 802.11, 802.11ac, 802.11n, 802.11g, 802.11ax, or in other wireless specifications.

In example embodiments, the target beacon receive time (TBRT) 206 is a time determined by the HEW device 104 and/or the AP 102. In example embodiments, the TBRT 206 is a time 204 that can be used by the HEW device 104 to determine when a beacon 208 will be transmitted by the AP 102. In example embodiments, the TBRT 206 is a timer. In example embodiments, information regarding the TBRT 206 is included in a beacon 208 that the HEW device 104 receives from the AP 102. In example embodiments, the TBRT 206 indicates only when some beacons 208 are transmitted. For example, the TBRT 206.1 indicates when beacon 208.3 is transmitted and TBRT 206.2 indicates when beacon 208.6 is transmitted.

In example embodiments, the HEW device 104 is configured to operate on one or more subchannels 214. The HEW device 104 may be configured to operate on the subchannel 214.1 without operating on the primary channel 210 for at least some of the time. For example, the HEW device 104 may tune to subchannel 214.1 and then, when the HEW device 104 needs to receive a beacon 208, the HEW device 104 may tune to the primary subchannel 210. The HEW device 104 may not tune to the primary subchannel 210 during some other periods to save power. The HEW device 104 may tune to the primary subchannel 210 based on determining TBRT 206. The HEW device 104 may have been scheduled to use subchannel 214.1 by the AP 102, which may have sent a schedule to the HEW device 104 indicating the subchannel 214 to operate on.

In example embodiments, the HEW device 104 operates on one or more subchannels 214 and may not operate on or tune the entire operation bandwidth 212 in order to save power and/or share the operation bandwidth 212.

In operation, the HEW device 104 may determine the TBRT 206 to determine when to tune to the primary channel 210 in order to receive a beacon 208. The HEW device 104 may determine the TBRT 206 based on received information in a previously received beacon 208. The HEW device 104 may determine the TBRT 206 based on information received from other HEW devices 104 that are not APs 102. The AP 102 may determine information needed to determine the TBRT 206 and transmit the information in an information element or beacon 208. The AP 102 may be configured to determine when to transmit beacons 208 based on determining the TBRT 206. For example, the AP 102 may determine the TBRT 206.1 and transmit beacon 208.3 based on the time 204 of TBRT 206.1. The AP 102 may transmit beacons 208 that are not based on the TBRT 206 and some beacons 208 that are based on the TBRT 206. The AP 102 may be configured to not transmit to the HEW device 104 before TBRT 206 so that the HEW device 104 does not miss the transmission due to the HEW device 104 tuning to the primary channel 210 to receive the beacon 208.

Figure 3:
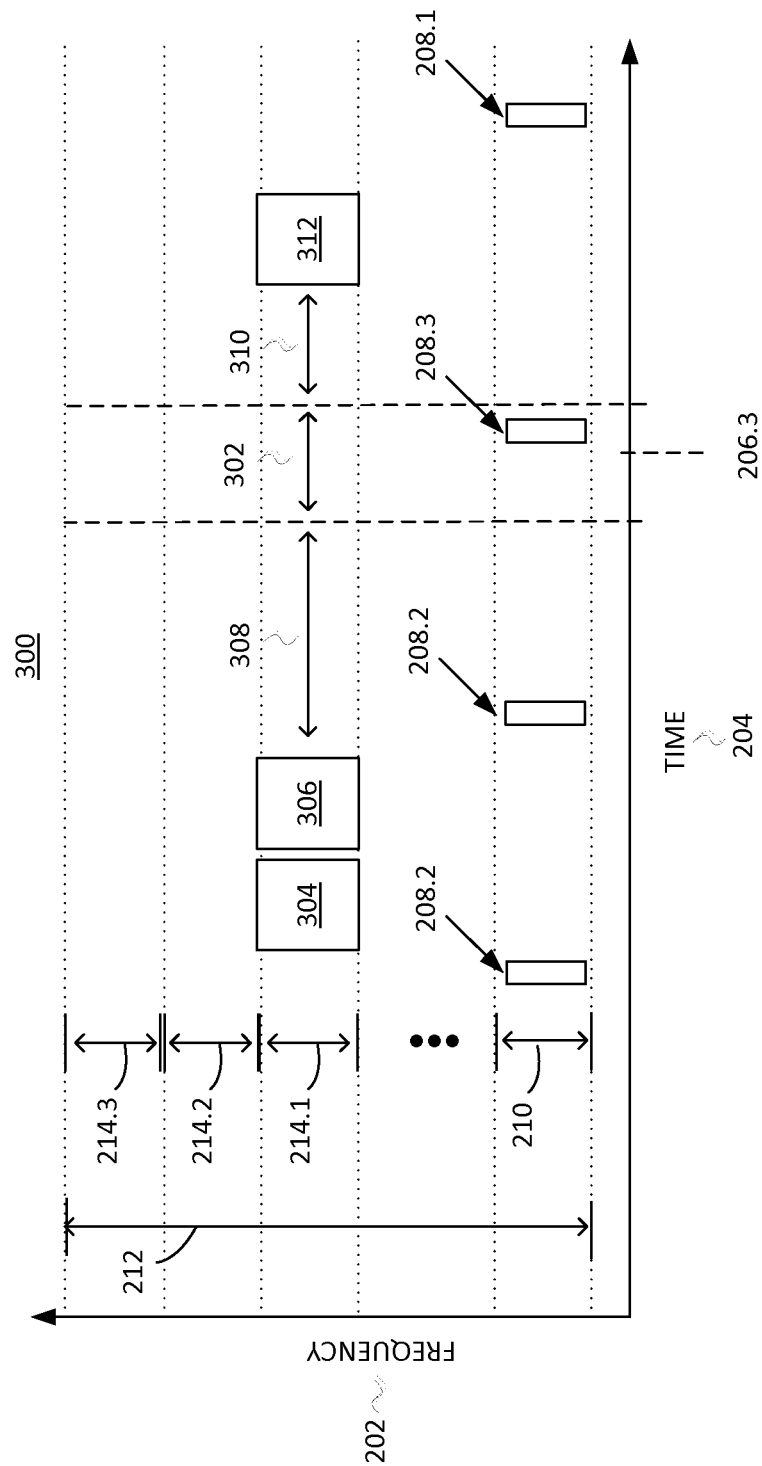
FIG. 3 illustrates a method to maintain system synchronization according to example embodiments.

FIG. 3 illustrates a method 300 to maintain system synchronization according to example embodiments. Illustrated in FIG. 3 is frequency 202 along the vertical axis and time 204 along the horizontal axis. Also illustrated in FIG. 3 are subchannels 214, primary channel 210, operation bandwidth 212, target beacon receive time (TBRT) 206, beacons 208, re-tune interval 302, data 304, 306, 312, power save mode 308, and power save mode 310.

Tune interval 302 may be an interval where the HEW device 104 leaves power save mode 308 and tunes from the subchannel 214.1 to the primary channel 210 and receives a beacon 208.3. The HEW device 104 may also re-turn to the subchannel 214.1 during the tune interval 302. The HEW device 104 may use information in the beacon 208.3 to re-synchronize with the AP 102 as disclosed in one or more of the specifications for the 802.11, or other wireless standards. The HEW device 104 may determine when to leave power save mode 308 based on when the next TBRT 206.3 occurs. The HEW device 104 may tune to the sub-channel 214.1 after receiving the beacon 208.

Data 304, 306, 312 are packets that may be uplink (UL) or downlink (DL) packets that are transmitted on the sub-channel 214.1. In example embodiments, the data 304, 306, 312 may be packets transmitted by or intended for the HEW device 104 using OFDMA and may be transmitted during a TXOP. For example, data 304 may be a HEW OFDMA DL, data 306 may be a HEW OFDMA UL, and data 312 may be a HEW OFDMA UL.

In operation, the HEW device 104 may be configured to determine TBRT 206. The HEW device 104 may determine TBRT 206 based on information from the AP 102 or another device. The HEW device 104 may operate on the subchannel 214.1 based on a schedule from the AP 102. The HEW device 104 may receive data 304 and transmit data 306. The HEW device 104 may go into a power save mode 308, 310. During tune interval 302, the HEW device 104 may exit the power save mode 308 and tune to the primary channel 210 and receive the beacon 208.3, and in example embodiments, re-tune to the sub-channel 214.1. In example embodiments, the HEW device 104 may retune to a different subchannel 214 or stay tuned to the primary channel 210. The HEW device 104 may need to receive a beacon 208 after a power save mode 308, 310 in order to synchronize with the AP 102.

The HEW device 104 may re-enter a power save mode 310. The HEW device 104 may exit the power save mode 310 and transmit data 312. In example embodiments, the HEW device 104 does not re-enter the power save mode 310, or may re-enter the power save mode 310 after a delay or after transmitting and/or receiving data 304, 306, 312. In example embodiments, the HEW device 104 receives information from the beacon 208.3 in the re-tune interval 302 that is used to determine a next TBRT 206 (not illustrated). In example embodiments the AP 102 and/or BSS 100 are configured not to transmit data 304, 306, 312 to the HEW device 104 during the re-tune interval 302.

The AP 102 may be configured not to transmit data 304, 306, 312 to the HEW device 104 during a time period based on the TBRT 206. For example, the AP 102 may not transmit data 304, 306, 312 to the HEW device 104 during the re-tune interval 302. In example embodiments, a beacon frame 208 includes a field to indicate how the TBRT 206 should be determined by the HEW device 104.

Example embodiments provide the technical effect that the HEW device 104 may re-tune right before the beacon frame 208 is transmitted so that the HEW device 104 does not miss any data packets or miss an opportunity to transmit a data packet. Example embodiments have the technical effect that the HEW device 104 may conserve power by being able to remain in a power conservation mode 308 until the HEW device 104 needs to tune to the primary channel 210.

Example embodiments have the technical effect that the HEW device 104 may conserve power by not tuning to the primary channel 210 until the HEW device 104 needs to tune to the primary channel 210 to receive a beacon 208. Example embodiments have the technical effect that the HEW device 104 receives beacons 208 without a need to exchange messages with the AP 102 to inform the AP 102 of the tuning and retuning events.

Figure 4:
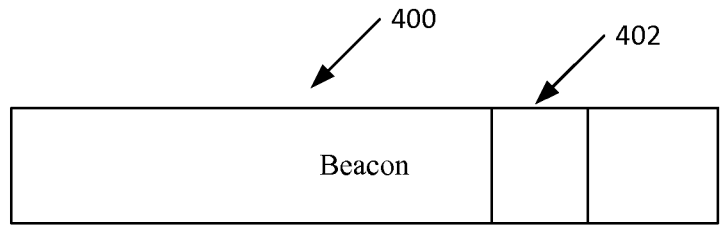
FIG. 4 illustrates a beacon frame according to some example embodiments.

FIG. 4 illustrates a beacon frame according to some example embodiments. Illustrated in FIG. 4 is a beacon frame 400. The beacon frame 400 may include a field 402 that indicates to a wireless device such as a HEW device 104 how to determine TBRT 206. The field 402 may be part of an information element. The beacon frame 400 may be in accordance with a standard such as 802.11ax.

Figure 5:
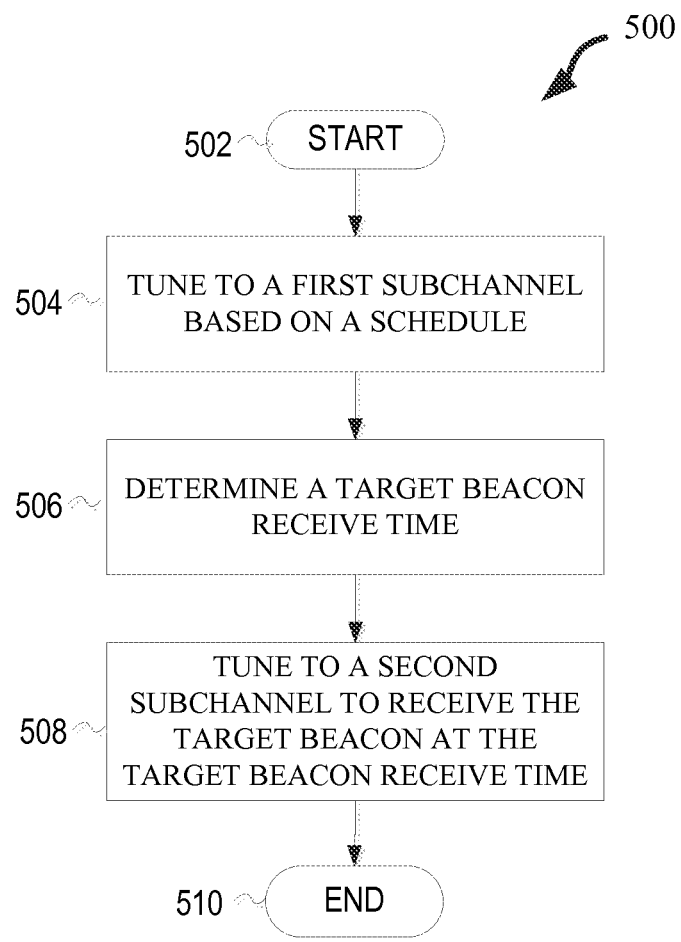
FIG. 5 illustrates a method for synchronization on a high-efficiency wireless (HEW) device according to example embodiments.

FIG. 5 illustrates a method 500 for synchronization on a high-efficiency wireless (HEW) device 104 according to example embodiments. The method 500 starts 502 and continues at 504 with tuning to a first subchannel 214 based on a schedule. For example, the HEW device 104 may receive a beacon 208 or another packet such as a signal field from the AP 102 which includes a schedule that indicates one or more subchannels 214 the HEW device 104 should operate on, which may also be termed that the HEW device 104 is assigned to the channel. The schedule may also indicate a time duration of the assignment to the channel. The channel assignment and time duration may be a transmission opportunity. The beacon 208, or other packet, may have included an indication of how the HEW device 104 may determine a target beacon receive time 206.

The method 500 continues at 506 with determining the target beacon receive time 206. For example, the HEW 104 may determine the target beacon receive time 206 based on one of the methods described in conjunction with FIG. 2 or 3.

The method 500 continues at 508 with tuning to a second subchannel 214 to receive the target beacon 208 at the target beacon receive time 206. For example, the HEW device 104 may tune to subchannel 210 at a time 204 before the target beacon receive time 206 in order to have enough time 204 to tune to the primary subchannel 210 before the beacon 208 arrives. The method 500 may end 510.

Figure 6:
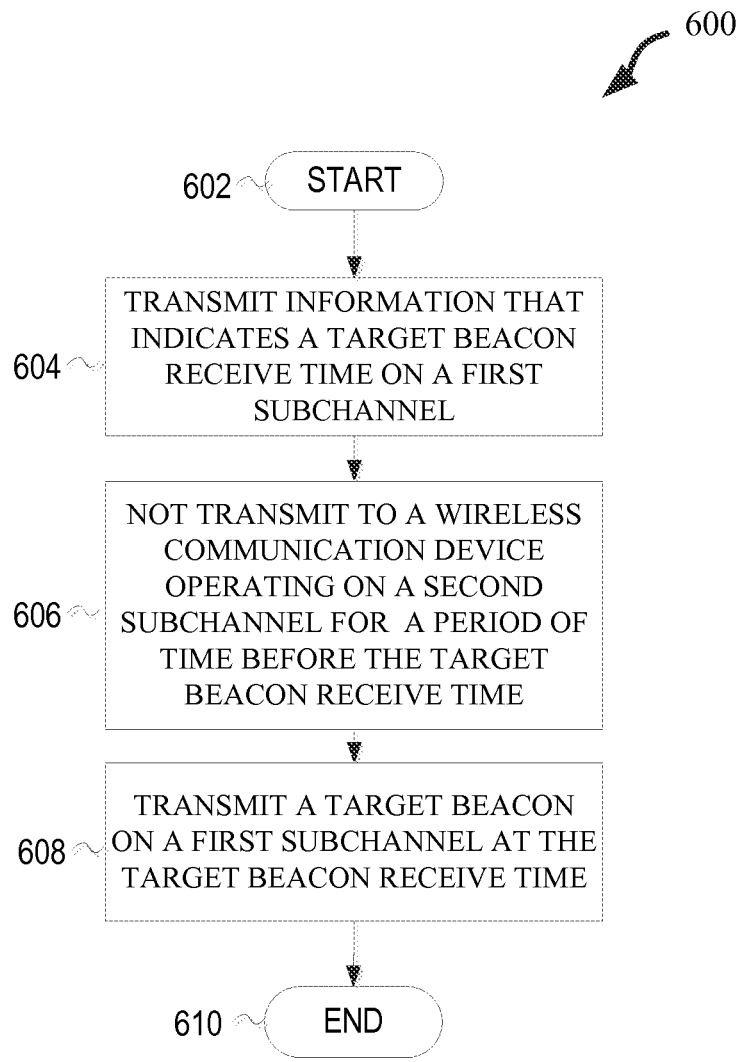
FIG. 6 illustrates a method for synchronization on an access point (AP) in a high-efficiency wireless local-area network (WLAN) according to example embodiments.

FIG. 6 illustrates a method 600 for synchronization on an access point (AP) 102 in a high-efficiency wireless local-area network (WLAN) according to example embodiments.

The method 600 may start 602 and continues at 604 with transmitting information that indicates a target beacon receives time 206 on a first subchannel 214. For example, the AP 102 may transmit an information element that indicates how HEW devices 104 are to determine a target beacon receive time 206. The method 600 continues at 606 with not transmitting to a wireless communication device operating on a second subchannel for a period of time 204 before the target beacon receive time 206. For example, the AP 102 may not transmit to a HEW device 104 operating on subchannel 214.1 for a time 204 before the target beacon receive time 206.

The method 600 continues at 608 with transmitting a target beacon 208 on a first subchannel 214 at the target beacon receive time 206. For example, the AP 102 may transmit beacon 208.3 at the target beacon receive time 206.3.

Figure 7:
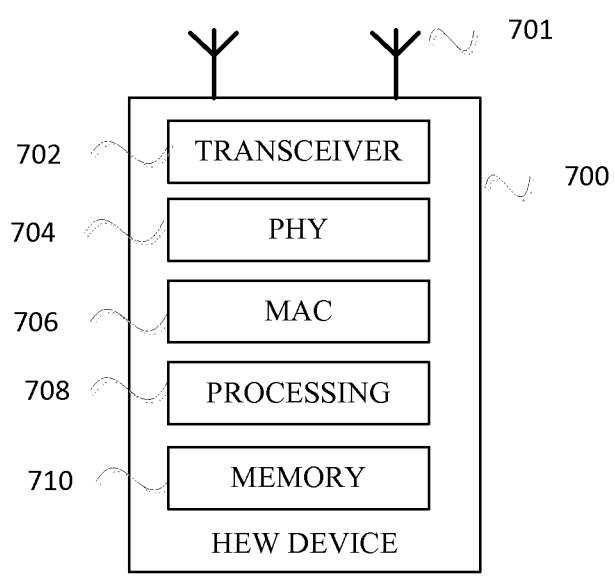
FIG. 7 illustrates a HEW device in accordance with some embodiments.

FIG. 7 illustrates a HEW device in accordance with some embodiments. HEW device 700 may be an HEW compliant device that may be arranged to communicate with one or more other HEW devices, such as HEW devices 104 (FIG. 1) or access point 102 (FIG. 1) as well as communicate with legacy devices 106 (FIG. 1). HEW devices 104 and legacy devices 106 may also be referred to as HEW stations (STAs) and legacy STAs, respectively. HEW device 700 may be suitable for operating as access point 102 (FIG. 1) or an HEW device 104 (FIG. 1). In accordance with embodiments, HEW device 700 may include, among other things, a transmit/receive element 701 (for example an antenna), a transceiver 702, physical layer (PHY) circuitry 704 and medium-access control layer circuitry (MAC) 706. PHY 704 and MAC 706 may be HEW compliant layers and may also be compliant with one or more legacy IEEE 802.11 standards. MAC 706 may be arranged to configure physical protocol data units (PPDUs) and arranged to transmit and receive PPDUs, among other things. HEW device 700 may also include other hardware processing circuitry 708 and memory 710 configured to perform the various operations described herein. The processing circuitry 708 may be coupled to the transceiver 702, which may be coupled to the transmit/receive element 701. While FIG. 7 depicts the processing circuitry 708 and the transceiver 702 as separate components, the processing circuitry 708 and the transceiver 702 may be integrated together in an electronic package or chip.

In some embodiments, the MAC 706 may be arranged to contend for a wireless medium during a contention period to receive control of the medium for the HEW control period and configure an HEW PPDU. In some embodiments, the MAC 706 may be arranged to contend for the wireless medium based on channel contention settings, a transmitting power level, and a clear channel assessment (CCA) level.

The PHY 704 may be arranged to transmit the HEW PPDU. The PHY 704 may include circuitry for modulation/demodulation, upconversion/downconversion, filtering, amplification, etc. In some embodiments, the hardware processing circuitry 708 may include one or more processors. The hardware processing circuitry 708 may be configured to perform functions based on instructions being stored in a RAM or ROM, or based on special purpose circuitry. In some embodiments, the hardware processing circuitry 708 may be configured to perform one or more of the functions described herein in conjunction with FIGS. 1-6.

In some embodiments, two or more antennas 701 may be coupled to the PHY 704 and arranged for sending and receiving signals including transmission of the HEW packets. The HEW device 700 may include a transceiver 702 to transmit and receive data such as HEW PPDU and packets that include an indication that the HEW device 700 should adapt the channel contention settings according to settings included in the packet. The memory 710 may be store information for configuring the other circuitry to perform operations for configuring and transmitting HEW packets and performing the various operations described herein in conjunction with FIGS. 1-6.

In some embodiments, the HEW device 700 may be configured to communicate using OFDM communication signals over a multicarrier communication channel. In some embodiments, HEW device 700 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the disclosed embodiments is not limited in this respect as they may also be suitable to transmit and/or receive communications in accordance with other techniques and standards. In some embodiments, the HEW device 700 may use 4× symbol duration of 802.11n or 802.11ac.

In some embodiments, an HEW device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point 102, a television, a medical device (e.g., a heart rate monitor, a blood pressure monitor, etc.), a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas 701, a graphics processor, an application processor, speakers, and other mobile device elements. The display may be an LCD screen including a touch screen.

The antennas 701 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 701 may be effectively separated to take advantage of spatial diversity and the different channel characteristics that may result.

Although the device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is a high-efficiency local-area wireless network (HEW) device. The HEW device may include circuitry configured to: tune to a first subchannel based on a schedule received from an access point (AP) the schedule to indicate that the HEW device is assigned to the first subchannel; determine a target beacon receive time; and tune to a second subchannel to receive a target beacon at the target beacon receive time.

In Example 2, the subject matter of Example 1 can optionally include where the circuitry is further configured to: receive the target beacon on the second subchannel, wherein the target beacon includes a network timer; synchronize a local timer with the network timer; and tune back to the first subchannel to continue to operate on the assigned first subchannel.

In Example 3, the subject matter of Example 1 can optionally include where the circuitry is further configured to: receive the target beacon and a new schedule on the second subchannel; and tune to a third subchannel, wherein the third subchannel is indicated in the new schedule.

In Example 4, the subject matter of Examples 1 through 3 can optionally include where the circuitry is further configured to: receive information regarding the target beacon receive time from a system information element. In Example 5, the subject matter of Examples 1 through 4 can optionally include where the system information element is contained in a previous beacon.

In Example 6, the subject matter of Examples 1 through 5 can optionally include where the first subchannel is a primary channel of a wireless local-area network (WLAN) and the second subchannel is a subchannel assigned to the wireless communication device by an access point (AP).

In Example 7, the subject matter of Example 6 can optionally include where the circuitry is further configured to enter a power save mode after the tune to the second channel. In Example 8, the subject matter of Example 7 can optionally include where the circuitry is further configured to tune to the second subchannel after each power save mode. In Example 9, the subject matter of Example 6 can optionally include where the (AP) is configured to not transmit to the HEW device for a period of time based on the target beacon receive time.

In Example 10, the subject matter of Examples 1 through 9 can optionally include where the schedule further comprises a time duration, and wherein the circuitry is further configured to operate in accordance with orthogonal frequency division multiple access (OFDMA) for the time duration, and operate in accordance with carrier sense multiple access with collision avoidance (CSMA/CA) after the time duration.

In Example 11, the subject matter of Example 10 can optionally include where the circuitry is further configured to operate in accordance with 802.11ax. In Example 12, the subject matter of Examples 1 through 11 can optionally include where the first subchannel and second subchannel are each one from the following group: 1.25 MHz, 2.5 MHz, 5 MHz, 7.5 MHz, 10 MHz, 20 MHz, 40 MHz, 80 MHz, 160 MHz, and 320 MHz.

In Example 13, the subject matter of Examples 1 through 10 can optionally further include memory and a transceiver coupled to the processing circuitry. In Example 14, the subject matter of Example 13 can optionally include one or more antennas coupled to the transceiver.

Example 15 is a method performed by a wireless communication device. The method may include tuning to a first subchannel based on a schedule received from an access point (AP) that indicates the wireless communication device is assigned to the first subchannel; determining a target beacon receive time; and tuning to a second subchannel to receive a target beacon at the target beacon receive time.

In Example 16, the subject matter of Example 15 can optionally include receiving the target beacon on the second subchannel, wherein the target beacon includes a network timer; synchronizing a local timer with the network timer; and tuning back to the first subchannel to continue to operate on the assigned first subchannel.

In Example 17, the subject matter of Example 15 can optionally include receiving the target beacon and a new schedule on the second subchannel; and tuning to a third subchannel, wherein the third subchannel is indicated in the new schedule.

In Example 18, the subject matter of Examples 15 through 17 can optionally include where the wireless communication device operates in accordance with 802.11ax.

Example 19 is an access point (AP) for synchronization. The AP may include circuitry configured to: transmit information that indicates a target beacon receive time on a first subchannel; not transmit to a wireless communication device operating on a second subchannel for a period of time before the target beacon receive time; and transmit a target beacon on a first subchannel at the target beacon receive time.

In Example 20, the subject matter of Example 19 can optionally include memory; a transceiver coupled to the processing circuitry; and one or more antennas coupled to the transceiver.

In Example 21, the subject matter of Examples 19 or 20 can optionally include where the circuitry is further configured to operate in accordance with 802.11ax.

In Example 22, the subject matter of Examples 19 through 21 can optionally include where the circuitry is further configured to transmit a schedule to the wireless communication device that indicates the wireless communication device is to tune to the second subchannel.

In Example 23, the subject matter of Examples 19 through 22 can optionally include where the circuitry is further configured to transmit additional beacons at times different than the target beacon receive time.

Example 24 is a non-transitory computer-readable storage medium that stores instructions for execution by one or more processors to perform operations for synchronization on a wireless communication device. The operations to configure the wireless communication device to: tune to a first subchannel based on a schedule received from an access point (AP) the schedule to indicate that the wireless communication device is assigned to the first subchannel; determine a target beacon receive time; and tune to a second subchannel to receive a target beacon at the target beacon receive time.

In example 25, the subject matter of Example 24 can optionally include where the operations further configure the wireless communication to: receive the target beacon on the second subchannel, wherein the target beacon includes a network timer; synchronize a local timer with the network timer; and tune back to the first subchannel to continue to operate on the assigned first subchannel.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A high-efficiency local-area wireless network (HEW) device, the HEW device comprising circuitry configured to:
   tune to a first subchannel based on a schedule received from an access point (AP) the schedule to indicate that the HEW device is assigned to the first subchannel; determine a target beacon receive time; tune to a second subchannel to receive a target beacon at the target beacon receive time; receive the target beacon on the second subchannel, wherein the target beacon includes a network timer; synchronize a local timer with the network timer; and tune back to the first subchannel to continue to operate on the assigned first subchannel.

2. The HEW device of claim 1, wherein the circuitry is further configured to: receive the target beacon and a new schedule on the second subchannel; and tune to a third subchannel, wherein the third subchannel is indicated in the new schedule.

3. The HEW device of claim 1, wherein the circuitry is further configured to: receive information regarding the target beacon receive time from a system information element.

4. The HEW device of claim 1, wherein the system information element is contained in a previous beacon.

5. The HEW device of claim 1, wherein the first subchannel is a primary channel of a wireless local-area network (WLAN) and the second subchannel is a subchannel assigned to the wireless communication device by an access point (AP).

6. The HEW device of claim 5, wherein the circuitry is further configured to enter a power save mode after the tune to the second channel.

7. The HEW device of claim 6, wherein the circuitry is further configured to tune to the second subchannel after each power save mode.

8. The HEW device of claim 5, wherein the (AP) is configured to not transmit to the HEW device for a period of time based on the target beacon receive time.

9. The HEW device of claim 1, wherein the schedule further comprises a time duration, and wherein the circuitry is further configured to operate in accordance with orthogonal frequency division multiple access (OFDMA) for the time duration, and operate in accordance with carrier sense multiple access with collision avoidance (CSMA/CA) after the time duration.

10. The HEW device of claim 9, wherein the circuitry is further configured to operate in accordance with 802.1 lax.

11. The HEW device of claim 1, wherein the first subchannel and second subchannel are each one from the following group: 1.25 MHz, 2.5 MHz, 5 MHz, 7.5 MHz, 10 MHz, 20 MHz, 40 MHz, 80 MHz, 160 MHz, and 320 MHz.

12. The HEW device of claim 1, further comprising memory and a transceiver coupled to the processing circuitry.

13. The HEW device of claim 12, further comprising one or more antennas coupled to the transceiver.

14. A method performed by a wireless communication device, the method comprising: tuning to a first subchannel based on a schedule received from an access point (AP) that indicates the wireless communication device is assigned to the first subchannel; determining a target beacon receive time; tuning to a second subchannel to receive a target beacon at the target beacon receive time; receiving the target beacon on the second subchannel, wherein the target beacon includes a network timer; synchronizing a local timer with the network timer; and tuning back to the first subchannel to continue to operate on the assigned first subchannel.

15. The method of claim 14, further comprising: receiving the target beacon and a new schedule on the second subchannel; and tuning to a third subchannel, wherein the third subchannel is indicated in the new schedule.

16. The method of claim 14, wherein the wireless communication device operates in accordance with 802.11ax.

17. A non-transitory computer-readable storage medium that stores instructions for execution by one or more processors to perform operations for synchronization on a wireless communication device, the operations to configure the wireless communication device to: tune to a first subchannel based on a schedule received from an access point (AP) the schedule to indicate that the wireless communication device is assigned to the first subchannel; determine a target beacon receive time; tune to a second subchannel to receive a target beacon at the target beacon receive time; receive the target beacon on the second subchannel, wherein the target beacon includes a network timer; synchronize a local timer with the network timer; and tune back to the first subchannel to continue to operate on the assigned first subchannel.

* * * * *